United States Patent [19]

Yoshimura

[11] Patent Number: 5,062,014
[45] Date of Patent: Oct. 29, 1991

[54] REVERSING DEVICE HAVING CHANGE-OVER MECHANISM FOR PINCH ROLLERS IN TAPE RECORDERS

[75] Inventor: Toshio Yoshimura, Kawasaki, Japan

[73] Assignee: Tanashin Denki Co., Ltd., Tokyo, Japan

[21] Appl. No.: 475,325

[22] Filed: Feb. 5, 1990

[30] Foreign Application Priority Data

May 23, 1989 [JP] Japan ................................ 1-59492[U]

[51] Int. Cl.$^5$ ...................... G11B 15/28; G11B 15/44
[52] U.S. Cl. ................................... 360/96.2; 360/74.1
[58] Field of Search ............................. 360/96.2, 74.1

[56] References Cited

U.S. PATENT DOCUMENTS

| | | | |
|---|---|---|---|
| 4,636,889 | 1/1987 | Deutsch et al. | 360/96.2 |
| 4,639,800 | 1/1987 | Tanaka et al. | 360/96.2 |
| 4,656,321 | 4/1987 | Ruyten | 360/96.2 |
| 4,779,147 | 10/1988 | Tanaka et al. | 360/74.1 |

Primary Examiner—John H. Wolff
Assistant Examiner—Craig A. Renner
Attorney, Agent, or Firm—Wegner, Cantor, Mueller & Player

[57] ABSTRACT

A reversing device for tape recorders includes a pivotable elongate resilient member having one end connected with a reciprocally movable changeover plate so as to move concurrently therewith in a direction perpendicular to the direction of movement of a head mounting plate, and a pivoted central portion movable relative to the head mounting plate in a direction perpendicular to the direction of movement to the head mounting plate. The elongate resilient member has a pair of abutment portions on opposite sides of the pivoted central portion. The head mounting plate has a pair of guide portions engageable with the abutment portions, respectively, in such a manner that in response to the position of displacement of the changeover plate, either of the two abutment portions engages a corresponding one of the guide portions to cause the elongate resilient member to pivot in a direction to disengage one pinch roller from the corresponding capstan. The reversing device thus constructed in composed of a relatively small number of components and hence is simple in construction and can be manufactured at a low cost.

5 Claims, 6 Drawing Sheets

REVERSING DEVICE HAVING CHANGE-OVER MECHANISM FOR PINCH ROLLERS IN TAPE RECORDERS

BACKGROUND OF THE INVENTION

1. Field of the Invention

The present invention relates to a reversing device for a tape recorder for allowing the tape recorder to change head configuration and the tape direction at the end of a tape so as to continue playing or recording on the reverse tracks without turning over the cassette.

2. Description of the Prior Art

Reversing devices for tape recorders of the type described are known. These known devices comprise a changeover plate reciprocally movable to changeover or switch the direction of a rotational power transmitting path extending from a drive motor, from one reel spindle to another reel spindle, and an elongate resilient member pivoted at its central portion to a head mounting plate and pivotally movable for causing its opposite ends to urge a pair of pinch rollers alternately to move into and out of contact with corresponding capstan shafts. One such known reversing device is disclosed in Japanese Patent Laid-open Publication No. 60-13349.

The disclosed reversing device includes a pair of rotation detecting members associated with the respective reel spindles in such a manner that a rotational power from each reel spindle is transmitted via a friction mechanism to a corresponding one of the rotation detecting members. Driving forces applied to the respective rotation detecting members are transmitted to a common actuating member. A lock mechanism engages the rotation detecting member on the tape supply side to separate the connection between the supply side rotation detecting member and the actuating member. The actuating member is driven to operate when the driving force transmitted from the rotation detecting member on the tape take-up side to the actuating member disappears.

With this construction, when the rotation of the reel spindles is stopped at the tape end, application of the driving force to the rotation detecting member on the tape take-up side is terminated, whereupon the actuating member is activated to displace a shift plate in a predetermined direction, thereby changing over or switching the direction of a rotational power transmitting path extending from the drive motor, from one reel spindle to another reel spindle.

As the shift plate is displaced, it urges a pivot member to turn in a predetermined direction, which pivot member is pivotally mounted on a fulcrum on a part of a head mounting plate disposed below a magnetic head.

This pivotal movement of the pivot member causes a rod spring on the pivot member to turn about the fulcrum whereupon left and right pinch roller arms are turned in opposite directions by the opposite ends of the rod spring. Thus, one of the pinch rollers is brought into contact with the corresponding capstan while at the same time the other pinch rollers is separated from the corresponding capstan.

The fulcrum described above is composed of a support shaft fixed to the head mounting plate. After the pivot member and the rod spring are mounted on the support shaft, an E-ring is attached to the support shaft to hold the pivot member and the rod spring in position on the support shaft against detachment.

The known reversing device of the foregoing construction requires a pinch roller changeover plate and a changeover pivot plate and hence has a problem that the number of component parts is relatively large and the construction is complicated.

Furthermore, since the support shaft having a peripheral groove with which the E-ring is fitted is disposed below the magnetic head, the position of the magnetic head is relatively high and a low profile reversing device is difficult to obtain.

SUMMARY OF THE INVENTION

With the foregoing drawbacks of the prior art in view, it is accordingly an object of the present invention to provide a reversing device for tape recorders which is composed of a reduced number of component parts and hence is simple in construction and can be manufactured at a low cost.

A reversing device for tape recorders according to the present invention includes a changeover plate reciprocally movable for changing over the direction of a rotational power transmitting path extending from a drive motor, from one reel spindle to another reel spindle, and an elongate resilient member pivoted at its central portion on a reciprocally movable head mounting plate and pivotally movable for causing its opposite ends to urge a pair of pinch rollers alternately to move into and out of contact with corresponding capstans. One of the opposite ends of the elongate resilient member is connected with the changeover plate so as to move concurrently with the changeover plate in a direction perpendicular to the direction of movement of the head mounting plate. The pivoted central portion of the elongate resilient member is movable relative to the head mounting plate in a direction perpendicular to the direction of movement of the head mounting plate. The elongate resilient member has a pair of abutment portions on opposite sides of the pivoted central portion thereof. The head mounting plate has a pair of guide portions engageable with the abutment portions, respectively, of the elongate resilient member in such a manner that in response to the position of displacement of the changeover plate, either of the two abutment portions of the elongate resilient member engages a corresponding one of the guide portions to cause the elongate resilient member to pivot in a direction to disengage one pinch roller from the corresponding capstan.

With this construction, a pinch roller changeover plate and a changeover pivot plate as required in the conventional reversing device can be omitted. Accordingly, the reversing device of the present invention is composed of a relatively small number of components and hence is simple in construction and can be manufactured at a low cost.

According to a preferred embodiment, a roller member is rotatably retained on the pivoted central portion of the elongate resilient member and is held in rolling engagement with a portion of the head mounting plate. This roller member facilitates a smooth movement of the elongate resilient member.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DESCRIPTION OF THE PREFERRED EMBODIMENT

The present invention will be described hereinafter in greater detail with reference to a preferred embodiment illustrated in the accompanying drawings, wherein like reference characters designate like or corresponding parts throughout the several views.

Figure 1:
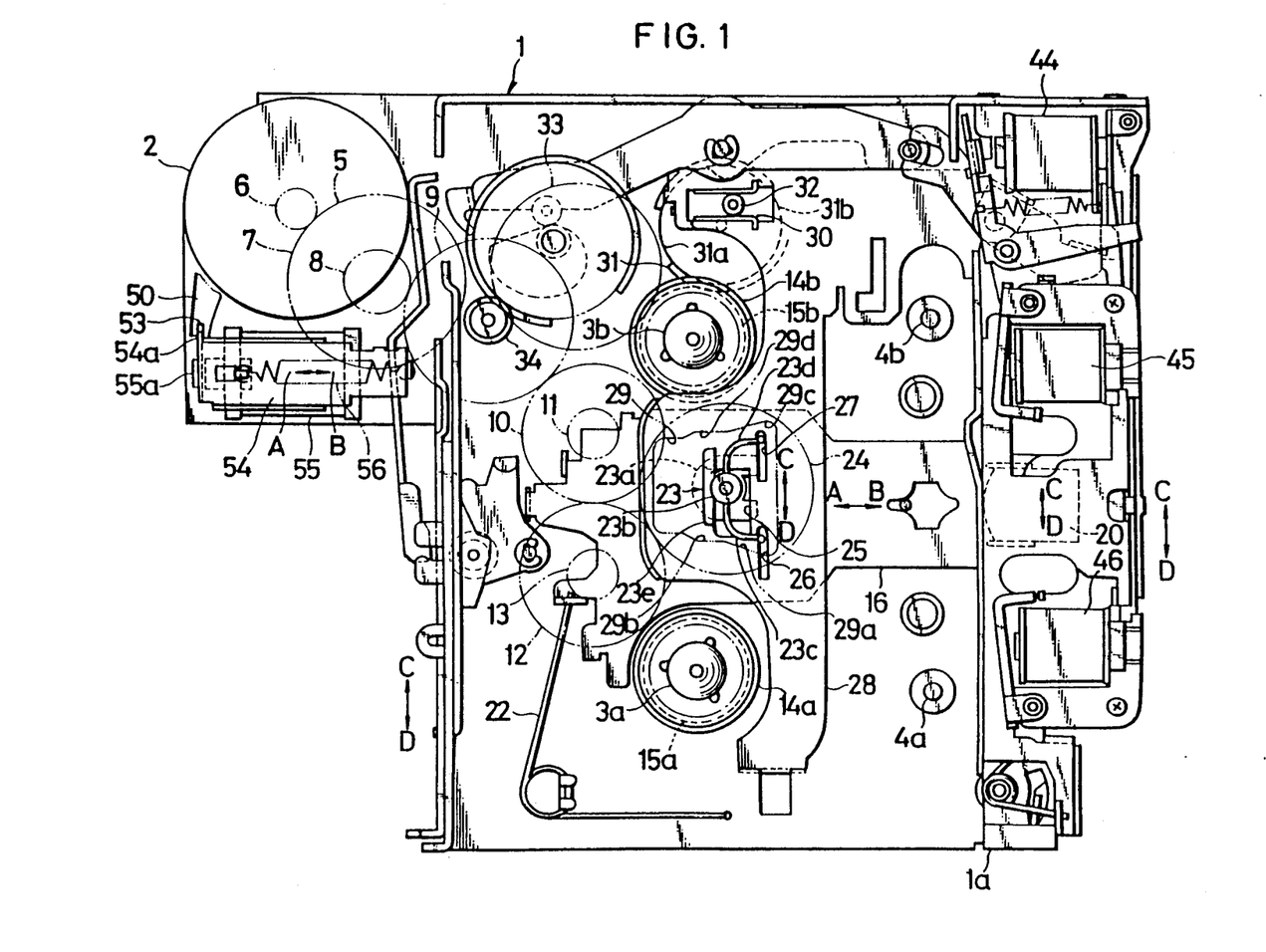
FIG. 1 is a plan view of a tape recorder incorporating a reversing device according to the present invention as it is in the inoperative stop mode and also shown with a tape cassette loading and ejecting mechanism omitted for clarity.

FIG. 1 shows a tape recorder incorporating a reversing device according to the present invention as it is in the inoperative or stop mode. In this figure, those component parts which are related to the loading and ejecting of a tape cassette are omitted for clarity. The tape recorder includes a base plate 1 carrying on its upper side a drive motor 2 for running a magnetic tape in the cassette, a pair of reel spindles 3a, 3b, and a pair of capstans 4a, 4b. The drive motor 2 produces a rotational power which in turn is transmitted through a rotational power transmitting gear mechanism 5 to the respective reel spindles 3a, 3b. The rotational power is also transmitted through a rotational power transmitting belt mechanism (not shown) to the respective capstans 4a, 4b.

The rotational power transmitting gear mechanism 5 includes a first gear 6 fixed to an output shaft of the drive motor 2, a second gear 7 held in mesh with the first gear 6, a third gear 8 coaxial with and rotatable in unison with the second gear 7, a fourth gear 9 held in mesh with the third gear 8, a fifth gear 10 held in mesh with the fourth gear 9, a sixth gear 11 coaxial with and rotatable in unison with the fifth gear 10, a seventh gear 12 held in mesh with the fifth gear 10, an eighth gear 13 coaxial with and rotatable in unison with the seventh gear 12, a pair of low speed reel gears 14a, 14b coaxial with and rotatable in unison with the respective reel spindles 3a, 3b, and a pair of high speed reel gears 15a, 15b coaxial with and rotatable in unison with the respective reel spindles 3a, 3b. In the play mode, a gear train composed of the eighth gear 13 and the low speed reel gear 14a on one of the reel spindles 3a (lower side in FIG. 1) meshing together via a low speed rotation changeover gear 24 and another gear train composed of the sixth gear 11 and the low speed reel gear 14b on the other reel spindle 3b (upper side in FIG. 1) meshing together via the low speed rotation changeover gear 24 are alternately selected to thereby rotate a corresponding one of the reel spindles 3a, 3b at a low speed (normal speed). In the fast forward (FF) mode and the rewind (REW) mode, a gear train composed of the seventh gear 12 and the high speed reel gear 15a on the reel spindle 3a meshing together via a high speed rotation changeover gear (not shown) and another gear train composed of the fifth gear 10 and the high speed reel gear 15b on the reel spindle 3b meshing together via the high speed rotation changeover gear are alternately selected whereby the reel spindle 3a or 3b is rotated at a high speed.

Figure 4:
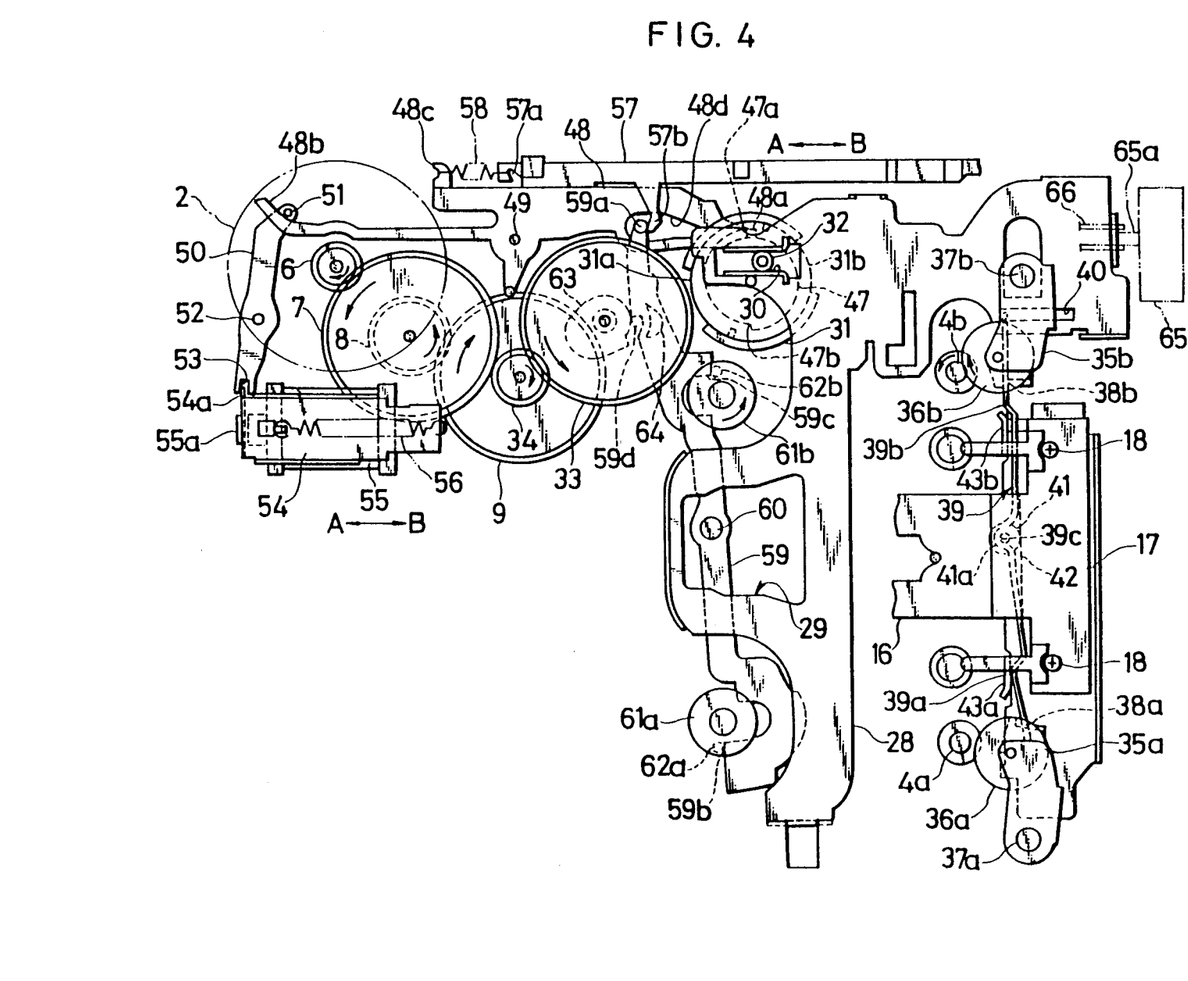
Figure 5:
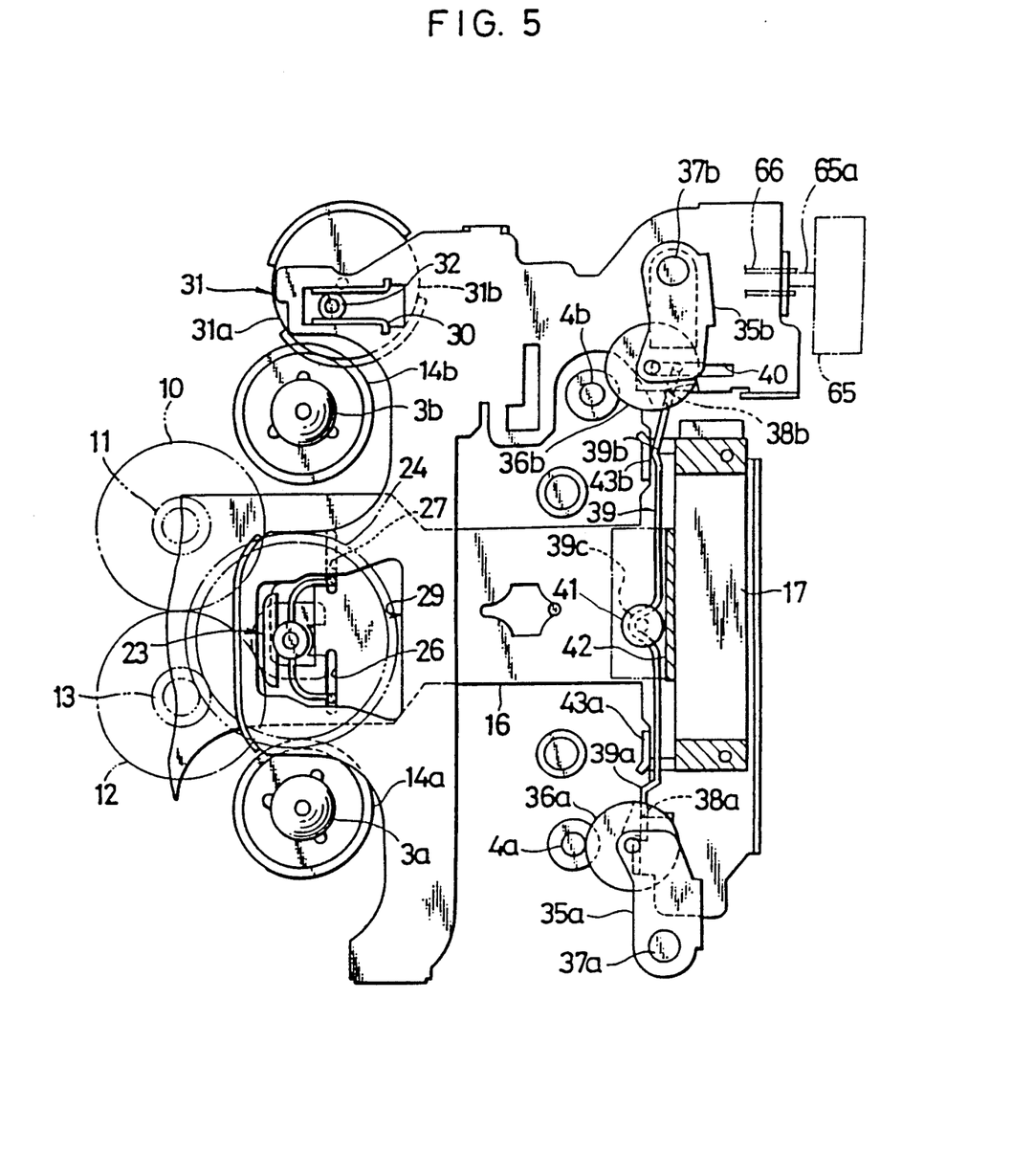
Figure 6:
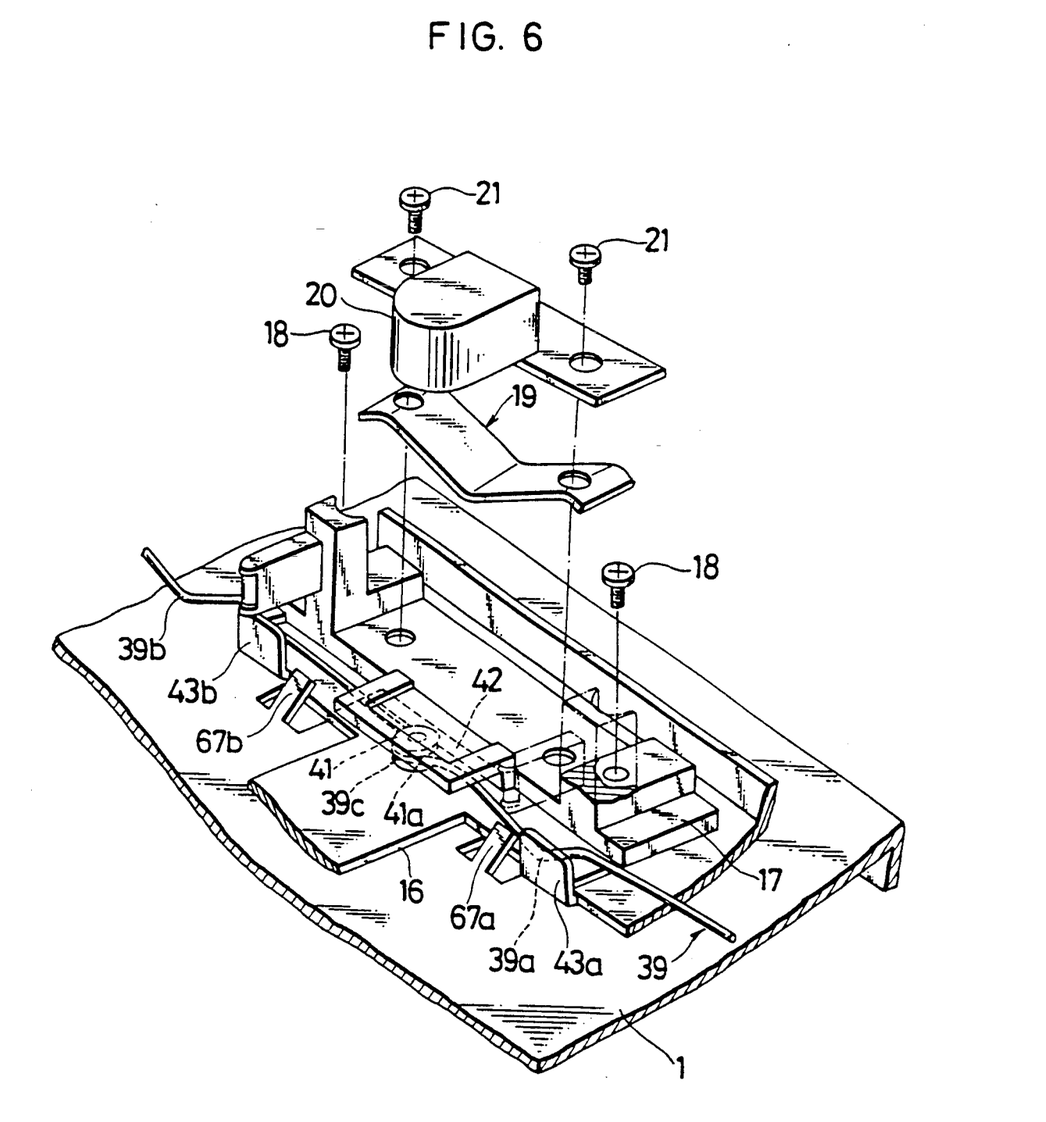
FIG. 6 is an exploded perspective view illustrative of the manner in which a magnetic head is attached to a head mounting plate.

A head mounting plate 16 is reciprocably mounted on an upper surface of the base 1 plate and movable back and forth (rightward and leftward in FIG. ) as indicated by the arrows A, B. The head mounting plate 16 supports on its upper surface an elongate tape guide 17 which is molded of synthetic resin and secured by a pair of screws 18, 18 to the distal end (right side in FIG. 1) of the head mounting plate 16, as shown in FIGS. 4 and 6. The tape guide 17 carries on its upper surface a magnetic head 20 with a leaf spring 19 disposed between the tape guide 17 and the magnetic head 20. The magnetic head 20 is brought into contact with the magnetic tape in the tape cassette (not shown) as the head mounting plate 16 is displaced in the direction of the arrow A to move into the play position when the play mode is selected. The head mounting plate 16 is normally urged by a head return spring 22 to retract in a direction indicated by the arrow B so as to separate the magnetic head 20 from the magnetic tape.

The low speed rotation changeover gear 24 is rotatably mounted on a support member 23 secured to the under surface of the head mounting plate 16 adjacent to the distal end (left side in FIG. 1) thereof. The low speed rotation changeover gear 24 is also reciprocally movable in a direction perpendicular to the direction of movement of the head mounting plate 16, as indicated by the arrows C, D in FIG. 1. The support member 23 is formed of synthetic resin and includes a planar body 23a, a short cylindrical portion 23b integral with the body 23a and projecting perpendicularly from the center of an upper surface of the body 23a, a pair of arcuate legs 23c, 23d integral with the cylindrical portion 23b and projecting radially outwardly from diametrically opposite portion of the cylindrical portion 23b, and an elongate anchor 23e integral with the cylindrical portion 23b and extending tangentially to the periphery of the cylindrical portion 23b at one side thereof (right side in FIG. 1). The cylindrical portions 23b is movably fitted in a first oblong hole 25 in the head mounting plate 16. Likewise, the legs 23c, 23d are movably fitted in second and third oblong holes 26, 27, respectively, in the head mounting plate 16. The planar body 23a and the anchor 23e of the support member 23 are disposed on opposite sides of a portion of the head mounting plate 16 with the anchor 23e and the legs 23c, 23d located on the upper side of the head mounting plate 16. In this condition, the anchor 23e and the legs 23c, 23d are disposed within a guide hole 29 in a shift plate (changeover plate) 28.

The shift plate 28 is mounted on the upper surface of the base plate 1 and reciprocably movable in a direction perpendicular to the direction of movement of the head mounting plate 16, as indicated by the arrows C, D. The shift plate 28 has an oblong engagement hole 30 in which is fitted an engagement pin 32 eccentric with the axis of a mutilated gear 31 and projecting from an upper surface of the mutilated gear 31. The mutilated gear 31 has a pair of diametrically opposite peripheral edges 31a, 31b devoid of teeth and is rotatably mounted on the under surface of the base plate 1 for mesh with a cam gear 33. The cam gear 33 is held in mesh with a small diameter gear 34 coaxial with and rotatable in unison with the fourth gear 9 of the rotational power transmitting gear mechanism 5. When the mutilated gear 31 is turned clockwise from its initial position shown in FIG. 1 through an angle of 180 degrees, the shift plate 28 is displaced in the direction of arrow D. A further clockwise movement of the mutilated gear 31 through an angle of 180 degrees causes the shift plate 28 to move in the direction of the arrow C. As the head mounting plate 16 is displaced in the direction of the arrow A to move toward the play position while the shift plate 28 is kept in its initial position shown in FIG. 1, the distal end portion of the leg 23c of the support member 23 slides from an oblique edge 29a to a straight guide edge 29b of the guide hole 29, thereby causing the support member 23 and the low speed rotation changeover gear 24 to move in the direction of the arrow C. Consequently, the low speed rotation changeover gear 24 is brought into mesh with the sixth gear 11 of the rotational power transmitting gear mechanism 5 and the low speed reel gear 14b of the reel spindle 3b. Conversely, when the shift plate 28 is displaced in the direction of D, displacement of the head mounting plate 16 into the play position causes the distal end portion of the leg 23d of the support member 23 to slide from an oblique edge 29c to a straight guide edge 29d. With this sliding movement of the leg 23d, the support member 23 and the low speed rotation changeover gear 24 are displaced in the direction of the arrow D so that the low speed rotation changeover gear 24 is brought into mesh with the eighth gear 13 of the rotational power transmitting gear mechanism 5 and the low speed reel gear 14a of the reel spindle 3a.

Figure 2:
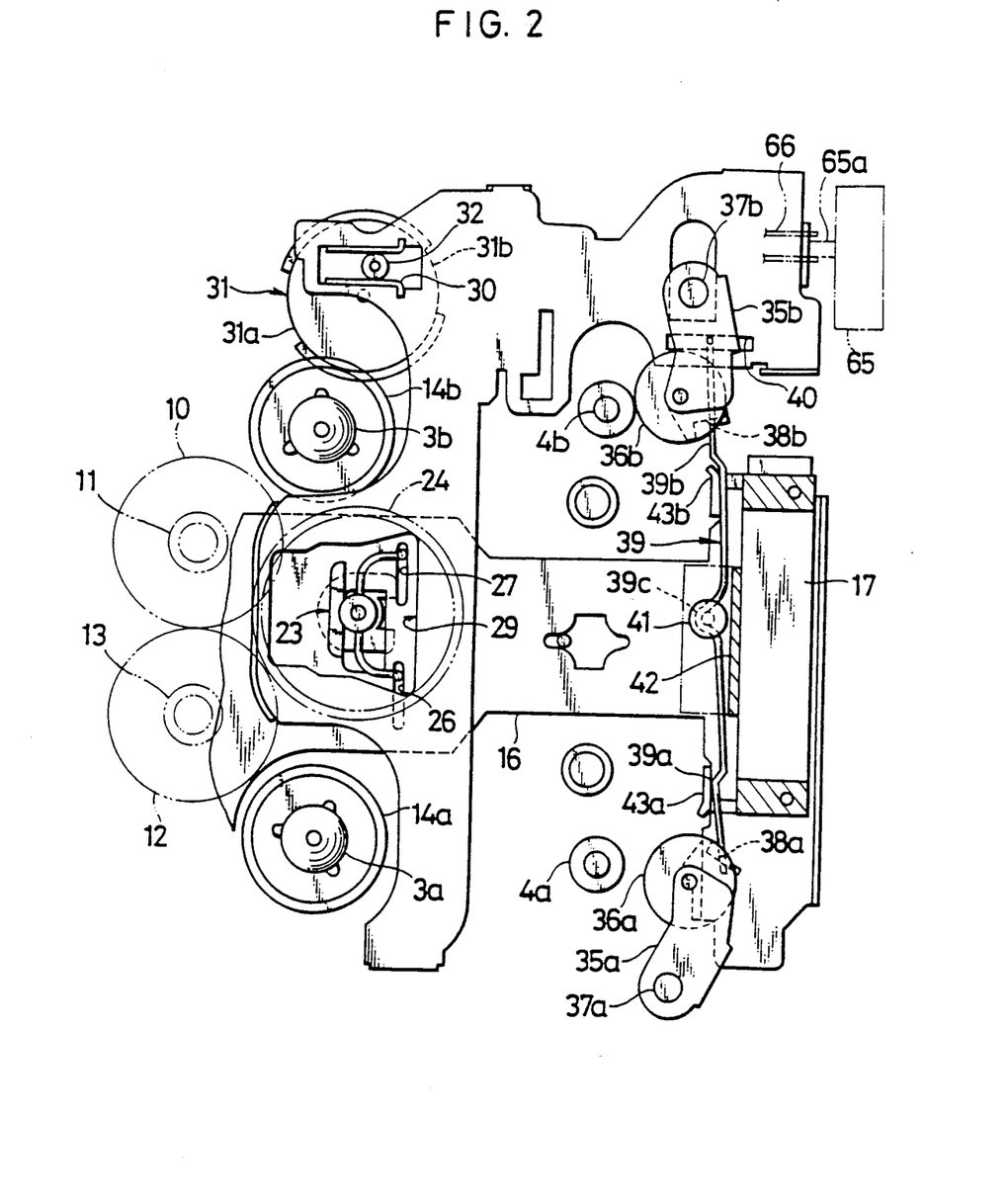
FIGS. 2 through 5 are views similar to FIG. 1, illustrating the operation of the reversing device.
Figure 3:
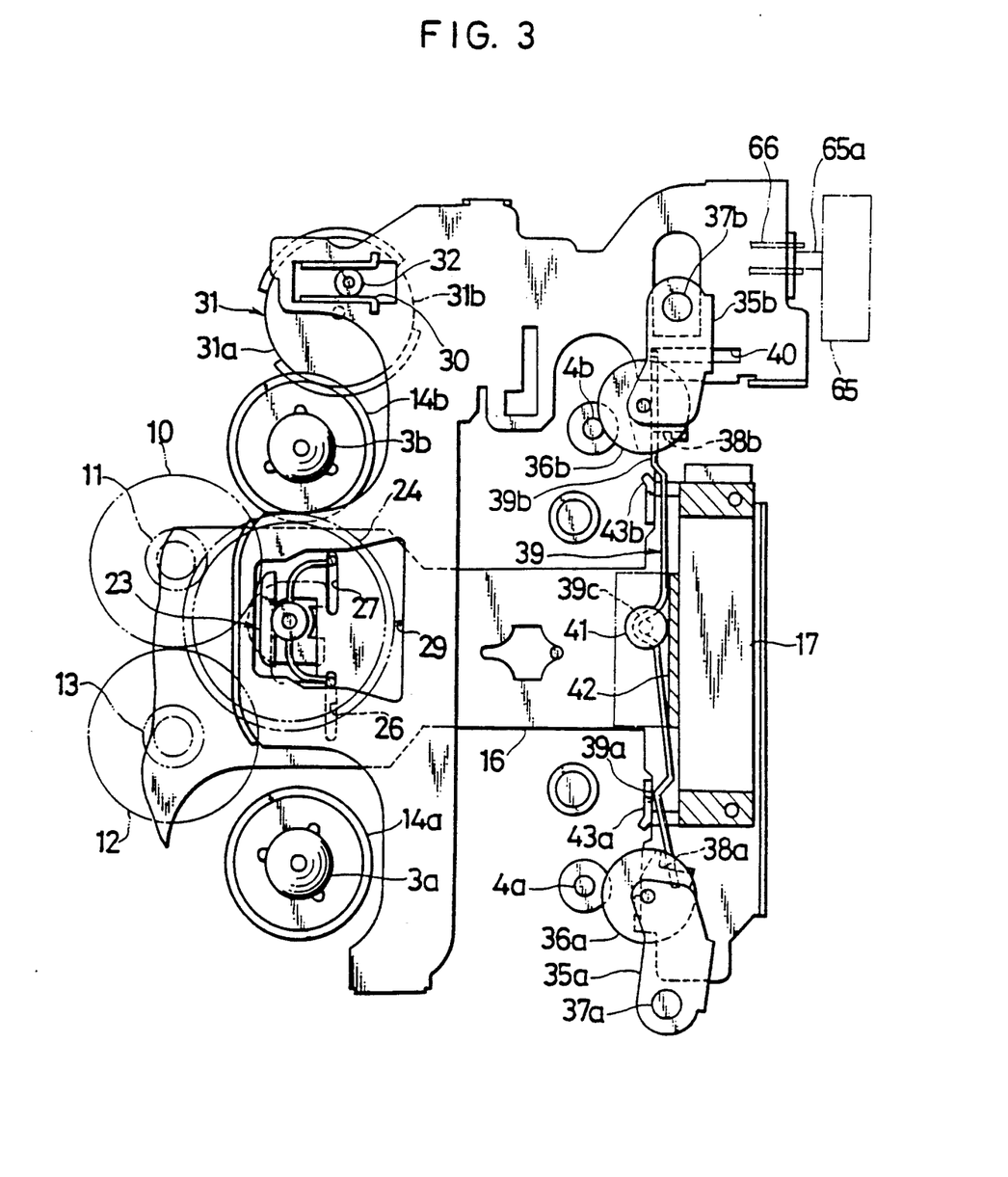

As shown in FIGS. 2 through 4, a pair of pinch rollers 36a, 36b is rotatably mounted on one end of a pair of pinch roller arms 35a, 35b, respectively, in confronting relation to the corresponding capstans 4a, 4b. The pinch roller arms 35a, 35b are pivotally connected at their other ends to a pair of mounting shafts 37a, 37b secured to the upper surface of the base plate 1.

As shown in FIGS. 2 through 6, one of the pinch roller arms 35a has a spring retaining portion 38a to which one end of a wire spring 39 is connected, the wire spring 39 constituting an elongate resilient member. The other end of the wire spring 39 is engaged in an oblong hole 40 in the shift plate 28 via a spring retaining portion 38b of the other pinch roller arm 35b. The wire spring 39 includes a pair of angled abutment portions 39a, 39b near the opposite ends thereof and a central arcuate bent portion 39c for engagement with a flat roller 41. The flat roller 41 constitutes a roller member and has an annular peripheral groove 41a in which the central arcuate bent portion 39c of the wire spring 39 is engaged. The roller 41 is thus rotatably retained on the central portion 39c of the wire spring 39. The roller 41 is held in rolling contact with a vertical guide surface 42 integral with the tape guide 17 for facilitating a smooth movement of the wire spring 39 in the directions indicated by the arrows C, D in FIG. 1. The wire spring 39 thus arranged is movable together with the shift plate 28 and the head mounting plate 16. When the shift plate 28 moves in one direction (indicated by the arrow C in FIG. 1), the angled abutment portion 39a of the wire spring 39 is struck on an upstanding guide strip 43a of the head mounting plate 16. The guide strip 43a constitutes a retainer portion. Conversely, a movement of the shift plate 28 in the opposite direction (indicated by the arrow D in FIG. 1) causes the angled abutment portion 39b of the wire spring 39 to run on another upstanding guide strip (retainer portion) 43b of the head mounting plate 16. After the head mounting plate 16 is shifted in the direction of the arrow A (FIGS. 1 and 4) to its play position, the shift plate 28 is displaced in the direction of the arrow C (FIG. 1) whereupon by the force of the wire spring 39, one of the pinch rollers 36a is urged to separate from the mating capstan 4a and at the same time the other pinch roller 36b is urged against the mating capstan 4b, as shown in FIG. 4. Conversely, when the shift plate 28 is displaced in the direction of the arrow D (FIG. 1) while the head mounting plate 16 is held in its play position, the pinch roller 36a is urged against the mating capstan 4a under the force of the wire spring 39 while at the same time the pinch roller 36b is urged to separate from the mating capstan 4b by the force of the wire spring 39.

A base frame 1a is upwardly spaced a distance from the base plate 1 as shown in FIG. 1 and it carries on its upper surface a first electromagnet 44 for the play mode operation, a second electromagnet 45 for the rewind mode operation, and a third electromagnet 46 for the fast forward mode operation. The first electrode 44 is energized when a tape cassette is set in a predetermined loading condition and, in response to the energization of this electromagnet 44, the head mounting plate 16 is moved in the direction of the arrow A against the force of the return spring 22. The second electromagnet 45 is adapted to be energized for starting the rewind mode operation. Further, when the third electromagnet 46 is energized, the fast forward mode operation is started.

As shown in FIG. 4, a disc cam 47 having a pair of diametrically opposite abutment steps 47a, 47b is provided on the under surface of the mutilated gear 31. The abutment steps 47a, 47b are alternately engageable with a stopper 48a formed at one end of a first trigger arm 48 to temporarily discontinue rotation of the mutilated gear 31. The first trigger arm 48 is pivoted at its central portion on a mounting shaft 49 secured to the base plate 1. The first trigger arm 48 has at its opposite end a first oblique surface 48b held in sliding contact with a pin 51 provided on one end of a second trigger arm 50. The second trigger arm 50 is pivoted at its central portion on another mounting shaft 52 secured to the base plate 1. The second trigger arm 50 has at its opposite end an engagement groove or recess 53 in which an engagement projection 54a of a slide plate 54 is received. The slide plate 54 is reciprocally movable in the same direction (indicated by the arrows A and B) as the head mounting plate 16 and is connected to a plunger 55a of a fourth electromagnet 56 provided for the eject operation. The fourth electromagnet 56 is mounted on the upper surface of the base plate 1 and when it is energized, the plunger 55a and the slide plate 54 are displaced in the direction of the arrow B to cause the second trigger arm 50 to turn in the counterclockwise direction. This angular movement of the second trigger arm 50 causes the first trigger arm 48 to turn counterclockwise whereupon the cam follow 48a is brought out of engagement with the abutment step 47a or 47b to thereby allow the mutilated gear 31 to rotate continuously. The slide plate 54 is normally urged in the direction of the arrow A by means of a return spring 56. The first trigger arm 48 further has a spring retaining portion 57c to which one end of a tension coil spring 58 is connected. The opposite end of the tension coil spring 58 is connected to a spring retaining portion 57a of a detect lever 57. The detect lever 57 is slidably mounted on the base plate 1 and reciprocally movable in the same direction (indicated by the arrows A and B) as the head mounting plate 16. While the first electromagnet 44 (FIG. 1) for the play mode operation is de-energized, the detect lever 57 is urged by the force of the spring 58 to slide in the direction of the arrow A. In this condition, a presser projection 57b of the detect lever 57 is brought into engagement with a vertical projection 59a on one end of a pivot arm 59 and urges the vertical projection 59a in a direction to turn the pivot arm 59 counterclockwise. When the first electromagnet 44 (FIG. 1) is energized, the detect lever 57 is slid in the direction of the arrow B against the force of the spring 58 so that the vertical projection 59a of the pivot arm 59 is no longer urged by the presser projection 57b of the detect lever 57. The pivot arm 59 is pivoted at its central portion on a mounting shaft 60 secured to the base plate 1. The pivot arm 59 has a pair of engagement surfaces 59b, 59c on opposite side of the mounting shaft 60. The engagement surfaces 59b, 59c are engageable with a pair of pins 62a, 62b, respectively, projecting vertically from a pair of friction plates 61a, 61b of a friction clutch mechanism disposed between the reel spindles 3a, 3b and the corresponding low and high speed reel gears 14a, 14b and 15a, 15b. The pivot arm 59 further has a cam follower projection 59d disposed substantially centrally between the vertical projection 59a and the engagement surface 59c for sliding engagement with first and second cams 63, 64 provided on the cam gear 33. While one of the friction plates 61a or 61b is rotating concurrently with the rotation of the reel spindle 3a or 3b, the pin 62a or 62b is brought into contact with the mating engagement surface 59b, 59c and urges the latter in a direction to turn the pivot arm 59 counterclockwise. When a tape end arrives at the rotating reel spindle 3a or 3b, the reel spindle 3a or 3b is subjected to a torque which is greater than a predetermined value whereupon the rotation of the reel spindle 3a or 3b and the corresponding friction plate 61a or 61b is terminated. Thus, the pivot arm 59 is released from the force tending to urge the pivot arm 59 to turn in the counterclockwise direction. Then the pivot arm 59 is turned clockwise by the action of the first cam 63 and thereafter it is further turned in the clockwise direction by the action of the second cam 64. In response to this clockwise movement of the pivot arm 59, the vertical projection 59a is brought into sliding contact with a second oblique surface 48d adjacent to the one end of the first trigger arm 48a, so that the first trigger arm 48 is turned in the counterclockwise direction to thereby bring the stopper 48a of the first trigger arm 48 out of engagement with the abutment step 47a or 47b of the disc cam 47 on the mutilated gear 31.

As shown in FIG. 6, a pair of inclined presser strips 67a, 67b projecting obliquely from the upper surface of the base plate 1 for engagement with portions of the head mounting plate 16. The inclined presser strips 67a, 67b thus formed have a certain degree of resiliency so that when the head mounting plate 16 is moved in the direction of the arrow A (FIG. 1), the inclined resilient presser strips 67a, 67b engage edge portions of the head mounting plate 16 and resiliently urge the head mounting plate 16 toward the base plate 1, thereby preventing floating or upward movement of the head mounting plate 16.

(Play Mode Operation)

A tape cassette (not shown) is loaded on the tape recorder while in the inoperative stop mode shown in FIGS. 1 and 2 and then a non-illustrated play button is actuated to turn a play switch (not shown) on whereupon the first electromagnet 44 for play mode operation is energized. Consequently, a rotational power transmitted from the drive motor 2 causes the head mounting plate 16 to move in the direction of the arrow A toward the play position, so that the magnetic head 20 is brought into contact with a magnetic tape in the tape cassette. In this instance if the shift plate 28 has been displaced in the direction indicated by the arrow C, the movement of the head mounting plate 16 toward its play position causes the legs 23c, 23d of the support member 23 to slide along the straight guide edges 29b, 29d of the guide hole 29 in the shift plate 28. Thus, the support plate 23 and the low speed rotation changeover gear 24 are concurrently moved in the direction of the arrow C so that the low speed rotation changeover gear 24 is brought into meshing engagement with the sixth gear 11 of the rotational power transmitting mechanism 5 and the low speed reel gear 14b of the reel spindle 3b. Consequently, the rotational power produced by the drive motor 2 is transmitted successively through the first to sixth gears 6-11 of the rotational power transmitting mechanism 5, the low speed rotation changeover gear 24 and the low speed reel gear 14b to the reel spindle 3b to thereby rotate the reel spindle 3b in the counterclockwise direction at a low speed (normal speed). On the other hand, simultaneously with the movement of the shift plate 28 in the direction of the arrow C, the wire spring 39 has been displaced in the same direction. Consequently, the angled abutment portion 39a rides the upstanding guide strip 43a while the angled abutment portion 39b is disengaged from the upstanding guide strip 43b. In this condition, the pinch roller arm 35b is urged by the force of the wire spring 39 to turn clockwise so that the pinch roller 36b supported on the pinch roller arm 35b is moved toward the mating capstan 4b. At the same time, the pinch roller 36a is separated from the capstan 4a. Accordingly, the magnetic tape is taken up around a reel hub of the tape cassette held on the reel spindle 3b while being continuously unwounded from the opposite reel hub supported on the reel spindle 3a. The play mode operation is thus achieved with parts held in the condition shown in FIGS. 3 and 4.

In the case where the shift plate 28 has been displaced in the direction indicated by the arrow D when the head mounting plate 16 is displaced toward the play position, this movement of the head mounting plate 16 causes the support member 23 to be displaced in the direction of the arrow D while its legs 23c, 23d being guided along the straight guide edges 29b, 29d of the guide hole 29 in the shift plate 28. As a consequence of the movement of the support member 23, the low speed rotation changeover gear 24 is brought into meshing engagement with the eighth gear 13 of the rotational power transmitting gear mechanism 5 and the low speed reel gear 14a of the reel spindle 3a. With this condition, the rotational power produced by the drive motor 2 is transmitted successively through the first to fifth gears 6-10, the seventh gear 12, the eighth gear 13, the low speed rotation changeover gear 24 and the low speed reel gear 14a to the reel spindle 3a, thereby rotating the reel spindle 3a in the clockwise direction at the low speed. On the other hand, since the wire spring 39 has been displaced in the direction of the arrow D simultaneously with the displacement of the shift plate 28, the angled abutment portion 39b rides the upstanding guide strip 43b while the angled abutment portion 39a is disengaged from the upstanding guide strip 43a. The wire spring 39 thus arranged urges the pinch roller arm 35a to turn counterclockwise to thereby frictionally grip the magnetic tape by the between the capstan 4a and the mating pinch roller 36a. In this instance, the pinch roller 36b is held out of engagement with the capstan 4b. Accordingly the magnetic tape is taken up around the reel hub retained on the reel spindle 3a while being continuously unwound from the reel hub retained on the reel spindle 3b. The play mode operation is thus achieved with parts held in the condition illustrated in FIG. 5.

(Auto-reverse Mode Operation)

In the play mode operation, the magnetic tape is continuously taken up around the reel hub on the reel spindle 3b from the reel hub on the reel spindle 3a. During that time, the friction plate 61b is rotated counterclockwise and hence the eccentric pin 62b on the friction plate 61b revolves around the axis of the friction plate 61b in the counterclockwise direction, thereby urging the engagement surface 59c in the direction to turn the pivot arm 59 counterclockwise. With this angular movement of the pivot arm 59, the cam follower projection 59d of the pivot arm 59 is brought into contact with the first cam 63 of the cam gear 33 while being rotated clockwise by the small diameter gear 34 of the rotational power transmitting gear mechanism 5.

When the magnetic tape is fully taken up around the reel hub on the reel spindle 3b, the friction plate 61b is caused to slip freely and hence the angular force tending to turn the pivot arm 59 in the counterclockwise direction is no longer produced. Consequently, the pivot arm 59 is turned clockwise by the action of the first cam 63 of the position in which the cam follower projection 59d frictionally engages foremost end of the first cam 33. In this instance, the second cam 64 of the rotating cam gear 33 is moved between the first cam 63 and the cam follower projection 59d so that the pivot arm 59 is further turned in the clockwise direction. With this two step angular movement of the pivot arm 59, the projection 59a is brought into abutment with the second oblique surface 48d, thereby causing the first trigger arm 48 to turn in the counterclockwise direction. Thus the stopper 48a of the first trigger arm 48 is disengaged from the stepped engagement portion 47a of the cam 47 on the mutilated gear 31, thereby releasing the mutilated gear 31.

The shift plate 28 is connected with a changeover actuator 65a of a head channel changeover switch 65 via a spring 66. When the shift plate 28 is displaced in the direction of the arrow C, due to overshoot, the spring 66 is biased or distorted in the direction of the arrow C slightly beyond a limit of movement of the changeover actuator 65a in the same direction. Thus, the changeover actuator 65a is urged to return in the direction of the arrow D under the force of the spring 66. Since the engagement hole 30 in the shift plate 28 is coupled with the engagement pin 32 on the mutilated gear 31, the changeover actuator 65a thus urged in the direction of the arrow D exerts a rotational force tending to turn the mutilated gear 31 in the clockwise direction. However, the clockwise rotation of the mutilated gear 31 is prevented because the stopper 48a of the first trigger arm 48 is held in engagement with the stepped engagement portion 47a or 47b of the cam 47 on the mutilated gear 31.

Thus, when the stopper 48a of the first trigger arm 48 disengages from the stepped engagement portion 47a, the mutilated gear 31 turns about its own axis in the clockwise direction until it meshes with the cam gear 33. After meshing engagement with the cam gear 33, the mutilated gear 31 is driven by the rotational force of the cam gear 33 to turn clockwise through an angle of approximately 180 degrees. Due to the connection between the engagement pin 32 and the engagement hole 30, the angular movement of the mutilated gear 31 causes the shift plate 28 to be displaced away from the position of FIG. 4 in the direction of the arrow D. In response to the displacement of the shift plate 28, the head channel changeover switch 65 is shifted and, at the same time, the support member 23 is guided along the guide edge 29b of the guide hole 29 in the shift plate 28 with the result that the low speed rotation changeover gear 24 is displaced in the direction of the arrow D in unison with the support member 23 and is brought into meshing engagement with the eighth gear 13 and the low speed rotation reel gear 14a on the side of the reel spindle 3a. The reel spindle 3a is thus rotated counterclockwise at a low speed. Simultaneously with the displacement of the shift plate 28, the wire spring 39 moves in the direction of the arrow D, so that the pinch roller arm 35a is urged by the force of the wire spring 39 to turn counterclockwise, thereby bringing the pinch roller 36a into contact with magnetic tape, with the magnetic tape gripped by and between the pinch roller 36a and the corresponding capstan 4a. In this instance, the pinch roller arm 35b is pivoted in the counterclockwise direction and hence the pinch roller 36b is retracted from the corresponding capstan 4b. Consequently, the tape running direction is reversed and the play mode operation is achieved in such a manner that the magnetic tape is taken up around the reel hub retained on the reel spindle 3a while being continuously unwound from the reel hub retained on the reed spindle 3b. In this play mode operation, the pin 62a on the friction plate 61a being rotated urges the engagement surface 59b of the pivot arm 59 to turn in the counterclockwise direction so that the cam follow projection 59d is again brought into contact with the first cam 63 on the cam gear 33. At the same time, the first trigger arm 48 is turned by the force of the spring 58 in the clockwise direction whereby the stopper 48a engages the stepped engagement portion 47b of the cam 47 on the mutilated gear 31. The rotation of the mutilated gear 31 is thus prevented again.

Thereafter, each time the magnetic tape is fully taken up in one direction, the foregoing sequence of operation steps is repeated, thereby performing the auto-reverse mode operation.

(Manual Reverse Mode Operation)

For instance, when a non-illustrated manual tape running direction changeover switch is turned on during the play mode operation in which the magnetic tape is continuously taken up around the reel hub retained on the reel spindle 3b from the reel hub retained on the reel spindle 3a, as shown in FIGS. 3 and 4, the electromagnet 44 for the play mode operation is de-energized and subsequently this electromagnet 44 and the electromagnet 55 for the eject operation are simultaneously energized. The plunger 55a of the electromagnet 55 and the movable plate 54 move in the direction of the arrow B against the force of the return spring 56. In response to this movement of the movable plate 54, the second trigger arm 50 is turned in the counterclockwise direction. Consequently, the pin 51 on the second trigger arm 50 urges the first oblique surface 48b of the first trigger arm 48 downwardly to thereby turn the first trigger arm 48 in the counterclockwise direction. The stopper 48a is thus disengaged from the stepped engagement portion 47a of the mutilated gear 31. The mutilated gear 31 is permitted to rotate in the clockwise direction and then is brought into mesh with the cam gear 33. With this meshing engagement with the cam gear 33, the mutilated gear 31 is turned clockwise through an angle of about 180 degrees whereby the shift plate 28 is displaced in the direction of the arrow D. Accordingly, as in the auto-reverse mode operation described above, the reel spindle 3a is rotated in the clockwise direction by the rotational force of the drive motor 2, and the pinch roller 36a is brought into contact with the capstan 4a while the pinch roller 36b is disengaged from the corresponding capstan 4b. Thus, the manual reverse mode operation is completed and then the play mode operation continues in such a manner that the magnetic tape is taken up around the reel hub retained on the reel spindle 3a from the reel hub retained on the reel spindle 3b.

Obviously, various modifications and variations of the present invention are possible in the light of the above teaching. It is therefore to be understood that within the scope of the appended claims the present invention may be practiced otherwise than as specifically described.

What is claimed is:

1. A reversing device for a tape recorder, comprising:
   (a) a changeover plate reciprocally movable in a direction perpendicular to the direction of movement of a head mounting plate so that the direction of a rotational power transmitting path extending from a drive motor can be changed over from one reel spindle to another reel spindle;
   (b) an elongate resilient member pivoted at its central portion on the head mounting plate and pivotally movable for causing its opposite ends to urge a pair of pinch rollers alternately to move into and out of contact with corresponding capstans;
   (c) one of said ends of said elongate resilient member being connected with said changeover plate so as to move concurrently with said changeover plate in a direction perpendicular to the direction of movement of said head mounting plate;
   (d) said pivoted central portion of said elongate resilient member being movable relative to said head mounting plate in a direction perpendicular to the direction of movement of said head mounting plate;
   (e) said elongate resilient member having a pair of abutment portions on opposite sides of said pivoted central portion thereof; and
   (f) said head mounting plate having a pair of guide portions engageable with said abutment portions, respectively, of said elongate resilient member in such a manner that in response to the position of displacement of said changeover plate, either of said two abutment portions of said elongate resilient member engages a corresponding one of said guide portions to cause said elongate resilient member to pivot in a direction to disengage one pinch roller from the corresponding capstan.

2. A reversing device according to claim 1, wherein said elongate resilient member comprises a wire spring having a central arcuate bent portion pivoted on said head mounting plate and a pair of angled portions on opposite sides of said central arcuate bent portion said angled portions constituting said abutment portions, respectively.

3. A reversing device according to claim 1, further including a roller member rotatably retained on said pivoted central portion of said elongate resilient member and held in rolling engagement with a portion of said head mounting plate.

4. A reversing device according to claim 3, wherein said roller member has a peripheral groove, and said elongate resilient member comprises a wire spring having a central arcuate bent portion fitted in said peripheral groove.

5. A reversing device according to claim 1, including a base plate on which said head mounting plate is movably mounted, said base plate having at least one inclined resilient presser strip engageable with a portion of said head mounting plate to urge said head mounting plate toward said base plate.

* * * * *